United States Patent Office 2,795,565
Patented June 11, 1957

2,795,565

METHOD FOR PREPARING HARD FLEXIBLE VINYL HALIDE POLYMER-LIQUID POLYEPOXIDE COMPOSITIONS AND RESULTING PRODUCTS

Herbert A. Newey, Lafayette, Calif., assignor to Shell Development Company, New York, N. Y., a corporation of Delaware No Drawing. Application November 9, 1953, Serial No. 391,133

20 Claims. (Cl. 260—30.6)

This invention relates to the preparation of vinyl halide polymer compositions which are hard and flexible. More particularly, the invention relates to a method for preparing hard, tough, and flexible vinyl halide polymer compositions using a special type of hardening plasticizer and to the products produced thereby.

Specifically, the invention provides a new and highly efficient method for preparing vinyl halide polymer compositions which are hard and tough but still highly flexible, which comprises incorporating with the vinyl halide polymer at least 20 parts per 100 parts of polymer of a liquid polyepoxide, and particularly a low molecular weight glycidyl polyether of a polyhydric phenol, and a minor amount of an epoxy-curing agent and then subjecting the resulting mixture to an elevated temperature to cure the polyepoxide. The invention also provides hard, tough and flexible products obtained by the above-described process.

As a special embodiment, the invention provides a method for preparing hard, tough and highly flexible coatings and films from vinyl halide polymer plastisol and organosol compositions which comprises dispersing finely-divided particles of the vinyl halide polymer in a liquid vehicle containing the liquid polyepoxide and a minor amount of an epoxy-curing agent so as to form a spreading fluid mixture, applying this mixture to the desired surface and then heating to effect the cure of the polyepoxide.

It is known that vinyl halide polymers may be made more flexible by incorporating plasticizing agents, such as dioctyl phthalate and tricresyl phosphate into the polymer composition. While the addition of these materials give more flexible products, it also lowers the strength of the compositions and makes them soft and supple. These properties make the products unsuited for many applications, such as manufacture of floor tile, coatings for seat covers, etc., where the finished products must be very hard and tough as well as flexible.

Attempts have been made to overcome these defects of the plasticized compositions by adding various agents which will harden during the processing of the polymers. Such attempts heretofore, however, have failed to give any satisfactory answer to the problem. In many cases, the hardening agents have made the products brittle and have thus destroyed the effect of the plasticizing agents. In other cases, the product formed after the curing of the hardening agent is a heterogeneous combination of two incompatible materials having very poor strength. Other of the suggested additives cannot be hardened during the short processing steps usually employed with the vinyl halide polymers, and, if the curing period is extended, the heat has a deleterious action on the polymers. Many of the suggested hardening agents are also too volatile and are lost during the curing process. Still further, many of the suggested hardening agents are unsuited for use in preparing plastisol compositions as they make the compositions too thick for use as a spreadable paste.

It is, therefore, an object of the invention to provide a method for preparing improved vinyl halide polymer compositions. It is a further object to provide a method for preparing vinyl halide polymer compositions which are very hard and tough but still highly flexible. It is a further object to provide flexible vinyl halide polymers having good strength. It is a further object to provide a new class of hardening plasticizing agents for vinyl halide polymers which give on cure homogeneous compositions having improved strength and flexibility. It is a further object to provide new hardening plasticizing agents for vinyl halide polymers which are suitable for use in preparing plastisol and organosol compositions. It is a further object to provide cured vinyl halide polymer compositions which are hard and tough but still highly flexible. Other objects and advantages of the invention will be apparent from the following detailed description thereof.

It has now been discovered that these and other objects may be accomplished by the process of the invention which comprises incorporating with the vinyl halide polymer at least 20 parts per 100 parts of polymer of a liquid polyepoxide, and particularly a low molecular weight glycidyl polyether of a polyhydric phenol, and a minor amount of an epoxy-curing agent and then subjecting the resulting mixture to an elevated temperature to cure the polyepoxide. It has been found that the liquid polyepoxides have good compatibility with the vinyl halide polymers and can be cured in combination therewith at a rapid rate during the usual processing steps of these polymers to produce homogenous compositions. The resulting homogeneous products are highly flexible and surprisingly are very hard and tough, and ideally suited for use in preparing hard rigid plastic articles, such as floor coverings, seat covers, etc. In addition, the compositions have been found to have good stability and can withstand long periods of use and exposure to high temperatures without loss of plasticizer through migration and/or volatization. Still further, the presence of the polyepoxides also gives the compositions increased stability to discoloration by heat and light and there is generally no need to add additional agents to prevent such discoloration.

The aforedescribed polyepoxides have also been found to be particularly suited for use in the preparation of improved plastisol and organosol compositions. When these products are combined with the finely-divided vinyl halide polymers alone or in combination with known plasticizers as dioctyl phthalate, and/or coating solvents, they form a fluid mixture that can easily be spread on cloth or metal panels and cured to produce hard flexible films or coatings. They are particularly suited for this application as they are relatively non-volatile and the resulting plasticized compositions can be cured in an open-system without fear of loss of plasticizer.

The hardening plasticizers used in the process of the invention comprise liquid polyepoxides, i. e., compounds containing a plurality of

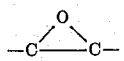

groups. They may be saturated or unsaturated, aliphatic, cycloaliphatic, aromatic or heterocyclic and may be substituted, if desired, with non-interfering substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of an epoxy equivalency. The expression "epoxy equivalency" refers to the average number of epoxy groups contained in the average molecule. This value is obtained by dividing the average molecular weight of the polyepoxide by the epoxide equivalent weight. The epoxide equivalent weight is determined by heating a one gram sample of the polyepoxide with an excess of pyridinium chloride dissolved in pyridine. The excess pyridinium chloride is then back-titrated with 0.1N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as, 2,3,4, and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

The monomeric-type polyepoxide compounds may be exemplified by the following: vinyl cyclohexene dioxide, epoxidized glycerides, as epoxidized soybean oil, butadiene dioxide, 1,4-bis(2,3-epoxypropoxy)benzene, 1,3-bis-(2,3 - epoxypropoxy)benzene, 4,4' - bis(2,3 - epoxypropoxy)diphenyl ether, 1,8 - bis(2,3 - epoxypropoxy)-octane, 1,4 - bis(2,3 - epoxypropoxy)cyclohexane, 4,4'-bis(2 - hydroxy - 3,4 - epoxybutoxy) diphenyldimethylmethane, 1,3 - bis(4,5 - epoxypentoxy) - 5 - chlorobenzene, 1,4 - bis(3,4 - epoxybutoxy) - 2 - chlorocyclohexane, diglycidyl ether, 1,3 - bis(2 - hydroxy - 3,4 - epoxybutoxy) benzene, 1,4 - bis(2 - hydroxy - 4,5 - epoxypentoxy)benzene, 1,2,5,6 - diepoxy - 3 - hexyne, 1,2,5,6 - diepoxyhexane, 1,2,3,4 - tetra(2 - hydroxy - 3,4 - epoxybutoxy) butane, and epoxy-substituted materials obtained by reacting diisocyanates with glycidol, such as, for example, compounds of the formula

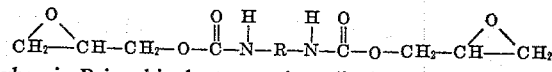

wherein R is a bivalent organic radical.

Other monomeric polyepoxides include the glycidyl esters of polycarboxylic acids, or esters of diepoxy-substituted acids, such as, for example, diglycidyl phthalate, diglycidyl adipate, diglycidyl maleate, dibutyl ester of epoxidized dimerized linoleic acid.

Other examples of this type include the glycidyl polyethers of the polyhydric phenols obtained by reacting a polyhydric phenol with an excess, e. g., 4 to 8 mole excess, of a halogen-containing epoxide in an alkaline medium. Thus, polyether A described hereinafter, which is substantially 2,2 - bis(2,3 - epoxypropoxyphenyl)propane is obtained by reacting bis-phenol, (2,2 - bis(4 - hydroxyphenyl)propane), with an excess of epichlorohydrin as indicated below. Other polyhydric phenols that can be used for this purpose include resorcinol, or polynuclear phenols, such as, 2,2-bis(4-hydroxyphenyl)butane, 4,4'-dihydroxybenzophenone, bis(4 - hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A further group of the polymeric polyepoxides comprises the hydroxy-substituted polyepoxy polyethers obtained by reacting, preferably in an alkaline medium, a slight excess, e. g., .5 to 3 mole excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl-2,3-epoxypropyl ether-styrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxystyrene).

Coming under special consideration, particularly because of their valuable properties as hardening plasticizers are the low molecular weight glycidyl polyethers of dihydric phenols obtained by reacting epichlorohydrin with a dihydric phenol in an alkaline medium. The monomeric products of this type may be represented by the general formula

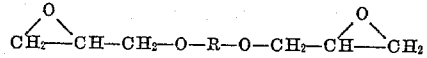

wherein R represents a divalent hydrocarbon radical of the dihydric phenol. The polymeric products will generally not be a single simple molecule but will be a complex mixture of glycidyl polyethers of the general formula

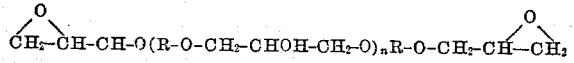

wherein R is a divalent hydrocarbon radical of the dihydric phenol and $n$ is an integer of the series 0, 1, 2, etc. While for any single molecule of the polyether $n$ is an integer, the fact that the obtained polyether is a mixture of compounds causes the determined value for $n$ to be an average which is not necessarily zero or a whole number. The polyethers may, in some cases, contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such so sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of one of the glycidyl polyethers will be illustrated below. Unless otherwise specified, parts indicated are parts by weight.

Preparation of glycidyl polyethers of dihydric phenols—Polyether A

About 2 moles of bis-phenol was dissolved in 10 moles of epichlorohydrin and 1 to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 500.

The glycidyl polyethers of polyhydric phenols obtained by condensing the polyhydric phenols with epichlorohydrin are also referred to as "ethoxyline" resins. See Chemical Week, vol. 69, page 27, for September 8, 1951.

Also of special interest are the polyglycidyl polyethers of polyhydric alcohols obtained by reacting a polyhydric alcohol with epichlorohydrin or glycerol dichlorohydrin in the presence of a catalyst and dehydrochlorinating the resulting product. A detailed description of a method for preparing these particular polyglycidyl polyethers may be found in Zech, U. S. 2,581,464. Special catalysts that may be used for the reaction of the polyhydric alcohol and epichlorohydrin are described in Marple et al. U. S. 2,260,753 and U. S. 2,327,053.

As indicated in the Zech patent, products obtained by the reaction of the polyhydric alcohols and epichlorohydrin or glycerol dichlorohydrin followed by dehydrochlorination may be described as polyether polyepoxide reaction products which, in general, contain at least three non-cyclic ether (—O—) linkages, terminal epoxide-containing ether

groups, and halogen attached to a carbon of an intermediate

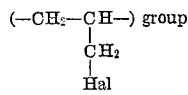

These halogen-containing polyether polyepoxide reaction products obtainable by partial dehydrohalogenation of polyhalohydrin alcohols may be considered to have the following general formula:

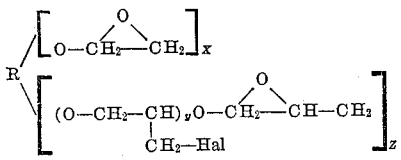

in which R is the residue of the polyhydric alcohol which may contain unreacted hydroxyl groups, X indicates one or more of the epoxy ether groups attached to the alcohol residue, y may be one or may vary in different reaction products of the reaction mixture from zero to more than one, and Z is one or more, and X+Z, in the case of products derived from polyhydric alcohols containing three or more hydroxy groups, averages around two or more so that the reaction product contains on the average two or more than two terminal epoxide groups per molecule.

The preparation of the polyglycidyl ethers of polyhydric alcohols may be illustrated below.

Preparation of glycidyl polyethers of polyhydric alcohols—Polyether B

About 276 parts (3 moles) of glycerol was mixed with 832 parts (9 moles) of epichlorohydrin. To this reaction mixture was added 10 parts of diethyl ether solution containing about 4.5% boron trifluoride. The temperature rose as a result of the exothermic reaction and external cooling with ice water was applied to keep the temperature between about 50° C. and 75° C. during a reaction period of about three hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was, therefore, about 2.13. For convenience, this product will be referred to hereinafter as Polyether B.

Particularly preferred members of this group comprise the glycidyl polyethers of the aliphatic polyhydric alcohols containing from 2 to 10 carbon atoms, and more preferably the alkanediols and alkanetriols containing from 2 to 8 carbon atoms, such products preferably having an epoxy equivalency between 1.0 and 2.5 and a molecular weight between 300 and 500.

If the polyepoxide plasticizers are to be used in the preparation of plastisol compositions, they should preferably have viscosities below about 50 poises at room temperature.

The polymers to be plasticized with the above-described polyepoxides according to the process of the invention include the thermoplastic vinyl halide polymers. The expression "vinyl halide polymer" as used throughout the specification and claims refers to those polymers containing a predominant quality, i. e., greater than 50% of the monomer units as vinyl halide units. This includes the homopolymers of the vinyl halides as well as the copolymers and interpolymers prepared therefrom. Other monomers that may be copolymerized with the vinyl halides include the vinyl-type monomers, i. e., monomers containing a single $CH_2=C=$ group, such as, for example, vinylidene chloride, methyl methacrylate, ethyl methacrylate, ethyl butyl maleate, diethyl maleate, dibutyl fumurate, allyl acetate, methallyl butyrate, acrylonitrile, methacrylonitrile, styrene, vinyl butyl ketone, vinyl ethyl ether, and the like.

Particularly preferred vinyl halide polymers to be used in the process of the invention include the homopolymers of the vinyl halides and the copolymers of the vinyl halides and ethylenically unsaturated esters, and particularly the alkenyl esters of saturated monocarboxylic acids, and the alkyl esters of the ethylenically unsaturated monocarboxylic acids, which esters preferably contain no more than 12 carbon atoms. The vinyl chloride homopolymers and copolymers are especially preferred.

The vinyl halide polymers employed in the process may have a variety of molecular weights. The preferred polymers, and this is particularly true when they are to be used in the preparation of plastisols and organosols, are those having a molecular weight as measured by the Staudinger method described in Ind. Eng. Chem., vol. 36, page 1152 (1936), of at least 15,000, and preferably above 20,000. Commercial grades of vinyl chloride polymers having molecular weights between 100,000 and 200,000 are particularly suited for use with the above-described polymerizable plasticizers.

If the polymers are to be used in the preparation of plastisol and organosol compositions, they should preferably be in a finely-divided state of subdivision. Generally, they should have a size of less than five microns and more particularly a size between 0.1 and 1 micron.

The hardening plasticizers of the present invention may be added to the vinyl-type polymers singly, in admixture or in combination with other plasticizing materials. The addition of other types of plasticizing agents along with the hardening plasticizers is desirable in many cases and particularly in those instances where the polymer is to be used in the preparation of a plastisol or organosol composition. Examples of plasticizing agents that may be used with the hardening plasticizers include the phosphoric acid esters of phenols or aliphatic alcohols, such as tricresyl phosphate, tritolyl phosphate, trioctyl phosphate, octyl cresyl phosphate, and tributoxyethyl phosphate, the alkyl and alkoxyalkyl esters of dicarboxylic acids and particularly the alkyl and alkoxyalkyl esters of the aromatic acids such as the phthalic acids, such as dibutyl phthalate, di-s-butyl phthalate, diamyl phthalate, diheptyl phthalate, di(2-ethylhexyl) phthalate, dibenzyl phthalate, dinonyl phthalate, dibutyl diglycolate, dibutyl adipate, dicyclohexyl phthalate, dibutyl sebacate, dibenzyl sebacate, butyl phthallyl butyl glycolate, triethylene glycol dioctanoate, polyethylene glycol sebacate, and the like. Preferred secondary plasticizers are the esters of phosphoric acid and the dialkyl and dialkoxyalkyl esters of the aromatic dicarboxylic acids.

The more preferred plasticizing materials to be used with polymerizable plasticizers, particularly if the composition is to be a plastisol, are the liquid plasticizers which have a boiling point above about 125° C. at 1 mm. Hg pressure and have a viscosity below about 20 poises at room temperature. Preferably, the viscosity is below 5 poises at 20° C.

The amount of the hardening plasticizer to be added to the vinyl-type polymer will vary over a wide range depending upon the type of product desired and process employed. If the vinyl polymers are to be used to produce calendered sheets or rigid molded articles, the amount of the hardening plasticizer may vary generally from 30 parts to 150 parts per 100 parts of polymer. Preferably the amount of the hardening plasticizer will vary from 20 to 80 parts and the secondary plasticizer from 80 to 20 parts per 100 parts of resin. The amount of the hardening plasticizer should generally no tbe reduced below about 10 parts per 100 parts of polymer. The ratio in which the hardening plasticizer and the secondary plasticizers are combined will depend on the properties desired as the two may be balanced to produce any desired degree of flexibility, hardness and toughness.

If the vinyl halide polymers are to be used in the preparation of plastisols, the amount of plasticizers employed generally will depend upon that required to form a fluid spreadable paste with the said polymer at normal temperature (e. g., 20° C.). The resulting composition preferably should have a viscosity not greater than 1000 poises at 20° C., and more preferably a viscosity between 50 and 400 poises at that temperature. Generally, the desired results are obtained by employing from 40 parts to 120 parts of the liquid hardening plasticizer. All but about 20 parts of this may be replaced by other plasticizing agents, such as dioctyl phthalate, tricresyl phosphate, and the like. When other plasticizers are employed, the hardening plasticizer is generally employed in amounts varying from 20 to 80 parts per 100 parts of polymer and the other plasticizer is employed in amounts varying from 80 parts to 20 parts per 100 parts of polymer.

In the case of organosols, the liquid vehicle will contain added solvents, such as xylene, and increased amounts of the hardening plasticizer can be tolerated. Preferred amounts of plasticizer to be used in the preparation of these compositions vary from 60 to 120 parts per 100 parts of polymer, and more preferably, from 70 to 100 parts per 100 parts of polymer.

The solvent employed in the preparation of the organosols may be any of the conventional coating solvents, such as toluene, high flash naphtha, methyl isobutyl ketone, xylene, diisobutyl ketone, dipentene, kerosene, and the like, and mixtures thereof. The amount of the solvent employed generally varies from 1 to 20 parts and in some cases may go as high as 30 parts per 100 parts of polymer.

The epoxy-curing agents used in the preparation of the compositions are those known to cure epoxy materials, such as, for example, organic acid and inorganic acids and anhydrides as citric acid, acetic acid, acetic acid anhydride, butyric acid, caproic acid, phthalic acid, phthalic acid anhydride, tartaric acid, aconitic acid, oxalic acid, succinic acid, succinic acid anhydride, lactic acid, maleic acid, maleic acid anhydride, fumaric acid, glutaconic acid, 1,2,4-butanetricarboxylic acid, isophthalic acid, terephthalic acid, malonic acid, 1,1,5-pentanetricarboxylic acid, acetoacetic acid, naphthalic acid, trimellitic acid, phosphoric acid, boric acid, sulfonic acids as benzenesulfonic acid, phosphinic acids, as dibenzenephosphinic acid, perchloric acid, persulfuric acid, and the like; the boron trifluoride complexes such as the p-cresol and urea complex, diethylaniline-boron trifluoride complex; and metal containing organic and inorganic compounds as zinc fluoborate, potassium persulphate, nickel fluoborate, copper fluoborate, sellenium fluoborate, magnesium fluoborate, tin fluoborate, potassium perchlorate, cupric sulfate, cupric phosphate, cupric phosphite, cobaltous fluoborate, cobaltous fluosilicate, chromic sulfate, chromic sulfite, lead arsenite, lead borate, lead molybdate, magnesium sulfate, cadmium arsenate, cadmium silicate, silver chlorate, silver fluosilicate, strontium chlorate, aluminum phosphate, aluminum fluoborate, ferrous sulfate, ferrous silicate, manganese hypophosphite, nickel phosphate, and nickel chlorate.

Particularly preferred curing agents to be used are the organic monocarboxylic and polycarboxylic acids and their anhydrides containing not more than 16 carbon atoms, inorganic acids of the formula $$H_a[(X)_w(Z)_y]$$

wherein X is a non-metal having an atomic weight above 2, Z is an element which tends to gain from 1 to 2 electrons in its outer orbit, $w$ is an integer, $y$ is an integer greater than 1, and $a$ equals the valence of the radical $[(X)_w(Z)_y]$ and the salts of these acids and metals having an atomic weight between 24 and 210 and being selected from griups I to IV and VIII of the periodic table of elements. Examples of these preferred catalysts include citric acid, phosphoric acid, phthalic acid, malonic acid, copper fluoborate, zinc fluoborate, iron fluoborate, cadmium fluoborate, nickel fluoborate, cobaltous fluoborate, cobaltous fluosilicate, magnesium fluoborate, strontium fluoborate, copper sulfate, nickel sulfate, copper fluosilicate, calcium phosphate, and magnesium fluosilicate.

The amount of the catalyst employed will vary over a wide range depending on the particular polyepoxide and catalyst selected and desired rate of cure. In most instances, the catalysts will vary from about 1 part to 20 parts per 100 parts of polyepoxide, and more preferably from 1 part to 10 parts per 100 parts of polyepoxide.

Various pigments, colors, fillers and resin stabilizers may also be added to the composition. Such base pigments as titanium dioxide, lead titanate and basic lead carbonate are suitable. Colors which may be used include anthraquinone and indanthrene blues, yellows and orange; phthalocyanine blues and greens; and cadmium and lithol reds.

In the preparation of calendered sheets, the vinyl halide polymer and polyepoxide are compounded together by means of any of the conventional equipment, such as mills of the heated roll type or internal mixers. The plasticizer and other compounding ingredients are worked into the said polymers so that they are thoroughly dispersed therein by means of such equipment, and the resultant composition then molded, calendered, extruded or otherwise formed into the desired article.

The temperature employed in the treatment of the composition should be sufficient to bring about the desired degree of cure of the polyepoxide. In the presence of the aforedescribed active curing agents, the curing of the plasticizer in combination with the vinyl halide resins can be accomplished at a relatively rapid rate at temperatures which generally range from 100° C. to 200° C. Prolonged heating should be avoided in many cases and particularly with the vinyl chloride polymers as it generally causes decomposition and discolorization of the said polymers. The milling of the compositions may generally be accomplished at temperatures ranging from 100° C. to 130° C., and the subsequent molding process may be accomplished at temperatures generally ranging from 125° C. to 200°C.

In some cases, it may be desirable to bring about only a partial cure of the hardening plasticizer. This is particularly desirable in case the hardening plasticizers are the only plasticizing materials employed and it is desired to maintain some, e. g., 1% to 30%, of the plasticizer in the monomeric form so as to bring about a lesser degree of hardness and more flexibility in the finished product. This may be accomplished by employing only a small amount of curing agent and/or by reducing the heating period proportionately. On the other hand, if extremely hard products are desired, the heating of the material may be continued until the plasticizer is substantially completely cured.

The plastisol and organosol compositions are prepared by merely mixing the finely-divided polymer into a liquid vehicle containing the polyepoxide and other desired ingredients. In the case of the organosols the liquid vehicle will also contain the desired solvent, such as xylene, etc. The mixing may be effected by simple stirring or milling at ordinary temperatures. If desired, a paint or ball mill may be used, but care must be exercised to keep the temperature low as the heat will thicken the spreadable mixture.

In utilizing the plastisol or organosol, it is generally applied to the surface of the article by the usual methods of spreading or dipping, and the applied material is then fused and gelled with heat whereby homogeneity of the liquid vehicle and the polymer is achieved. For this purpose, heating at about 150° C. to 200° C. is usually satisfactory. The heat employed in this procedure should also be regulated so as to bring about the desired degree of polymerization of the polymerizable plasticizer. Because of the large surface covered by these films, the curing of the plasticizer in the presence of the curing agent can generally be accomplished in a very short period and the resulting films will be very flexible but hard and tough. It may also be desirable in these cases to effect only a partial cure of the plasticizer in order to bring about a lesser degree of hardness. This also may be accomplished by employing a smaller amount of catalyst and/or reducing the heating period.

As indicated, the plasticized vinyl halide polymer compositions of the present invention are homogeneous products which are very hard and tough yet have excellent flexibility. Calendered sheets may be cut and fabricated to produce many valuable articles of commerce. The molded articles prepared from the compositions are flexible but very hard and have excellent strength and abrasion resistance. The plastisols and organosols produced according to the invention may be used to form coatings for metals, cloth, etc., or self-supporting films which are very tough and leathery but still highly flexible.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

EXAMPLE I

A plastisol composition was prepared by combining 100 parts of finely-divided polyvinyl chloride having a molecular weight of about 120,000 with 60 parts of a liquid glycidyl polyether of bisphenol (Polyether A described above), 60 parts of an octyl-cresyl phosphate, 2 parts of dibutyl tin dilaurate and 2 parts of boron trifluoride-p-cresol complex and mixing the ingredients together to form a paste. The resulting paste which was a smooth fluid spreadable mixture was applied by means of a doctor blade to metal panels to form thin films and the coated panels heated for 50 minutes at 180° C. The resulting films were homogeneous compositions which were very tough and hard but still very flexible. The films were substantially as flexible and very much harder than similar films prepared from a mixture containing 60 parts of dioctyl phthalate and no hardening plasticizer.

EXAMPLE II

A plastisol composition was prepared by combining 100 parts of finely-divided polyvinyl chloride having a molecular weight of about 120,000 with 40 parts of Polyether A, 20 parts of epoxidized soybean oil, 60 parts of an octyl-cresyl phosphate, 2 parts of dibutyl tin dilaurate and 2 parts of boron trifluoride-p-cresol complex and mixing the ingredients together to form a paste. The resulting paste which was a smooth fluid spreadable mixture was applied to metal panels and baked at 180° C. for 50 minutes as in Example I. The resulting films were homogeneous compositions which were very hard and tough but still very flexible.

EXAMPLE III

An organosol is prepared by mixing 100 parts of finely-divided polyvinyl chloride with 40 parts of Polyether A, 50 parts of octyl-cresyl phosphate, 2 parts of dibutyl tin dilaurate and 2 parts of boron trifluoride-p-cresol and 20 parts of a solvent comprising toluene and high boiling naphthas and mixing the ingredients together to form a spreadable mixture. The mixture is then spread on metal panels and baked at 180° C. The resulting films are homogeneous compositions which are hard, tough and highly flexible.

EXAMPLE IV

A plastisol composition is prepared by mixing 100 parts of a finely-divided vinyl chloride-vinyl acetate copolymer with 60 parts of Polyether A, 60 parts of dioctyl phthalate, 2 parts of dibutyl tin dilaurate and 2 parts of zinc fluoborate and mixing the ingredients together to form a fluid spreadable paste. This paste is then spread on metal panels and baked at 180° C. The resulting films are homogeneous compositions which are hard and tough and highly flexible.

EXAMPLE V

An organosol is prepared by mixing 100 parts of finely-divided polyvinyl chloride with 60 parts of Polyether B, 50 parts of an octyl-cresyl phosphate, 2 parts of dibutyl tin dilaurate, 2 parts of boron trifluoride-p-cresol complex and 20 parts of a solvent comprising toluene and high boiling naphthas and mixing the ingredients together to form a spreadable mixture. This mixture is then spread on metal panels and baked at 180° C. The resulting films are homogeneous products which are hard but highly flexible.

EXAMPLE VI

An organosol is prepared by mixing 100 parts of a finely-divided copolymer of vinyl chloride and vinylidene chloride with 60 parts of a liquid polymer of allyl glycidyl ether having an epoxy value of 0.5 eq./100 g. and a molecular weight of 481, 2 parts of dibutyl dilaurate, 2 parts of boron trifluoride-p-cresol complex and 20 parts of a solvent comprising toluene and high boiling naphthas and mixing the ingredients together to form a spreadable mixture. This mixture is then spread on metal panels and baked at 180° C. The resulting films are homogeneous products which are hard but highly flexible.

I claim as my invention:

1. A process for preparing vinyl halide polymer compositions which are hard and tough but still highly flexible which comprises incorporating with the vinyl halide polymer which contains at least 50% vinyl halide units at least 20 parts per 100 parts of polymer of a liquid polyepoxide having an epoxy equivalency greater than 1.0 and a minor quantity of an epoxy-curing agent free of nitrogen and then heating the mixture to effect the cure of the polyepoxide.

2. A process as in claim 1 wherein the polyepoxide is a liquid glycidyl polyether of a polyhydric phenol having an epoxy-equivalency between 1.1 and 2.5 and a molecular weight between 300 and 500.

3. A process as in claim 1 wherein the polyepoxide is a liquid glycidyl polyether of a polyhydric aliphatic alcohol having an epoxy equivalency between 1.1 and 3.0 and a molecular weight between 300 and 500.

4. A process as in claim 1 wherein the epoxy-curing agent is an acid-acting compound.

5. A process for preparing coatings and films of vinyl halide polymers which are hard, tough, and flexible products which comprises dispersing a finely-divided vinyl halide polymer which contains at least 50% vinyl halide units in a liquid medium containing 20 parts to 150 parts per 100 parts of polymer of a liquid polyepoxide having an epoxy equivalency gretaer than 1.0, a minor amount of an epoxy-curing agent free of nitrogen and a liquid non-polymerizable plasticizer for the vinyl halide polymer, applying the mixture to the desired surface and then applying heat to effect the cure of the polyepoxide.

6. A process as in claim 5 wherein the polymer is a finely-divided polymer of vinyl chloride having a molecular weight above 20,000.

7. A process as in claim 5 wherein the polyepoxide is a liquid glycidyl polyether of 2,2-bis(hydroxyphenyl)-propane having an epoxy equivalency between 1.0 and 2.5 and a molecular weight below 500.

8. A process as in claim 5 wherein the polyepoxide is a polymer of allyl glycidyl ether having an epoxy equivalency greater than 1.0 and a molecular weight between 200 and 500.

9. A process as in claim 5 wherein the epoxy-curing agent is a metal salt of an inorganic acid.

10. A process as in claim 5 wherein the epoxy-curing agent is a BF$_3$ complex.

11. A process as in claim 5 wherein the non-polymerizable plasticizer is a nester of phosphoric acid.

12. A process as in claim 5 wherein the polyepoxide is a liquid glycidyl polyether on glycerol having an epoxy equivalency between 2.0 and 3.0 and a molecular weight between 200 and 400.

13. A composition capable of being cured to form a hard, flexible product comprising a vinyl halide polymer which contains at least 50% vinyl halide units, at least 20 parts per 100 parts of polymer of a liquid polyepoxide having an epoxy equivalency greater than 1.0, and a small amount of an epoxy-curing agent free of nitrogen.

14. A hard, flexible product obtained by heating the composition defined in claim 13 to a curing temperature.

15. A spreadable fluid composition capable of being cured to form hard, flexible products comprising a vinyl chloride polymer containing at least 90% vinyl chloride units, and being selected from the group consisting of polyvinyl chloride and copolymers of vinyl chloride and a dissimilar monomer containing a $CH_2=C=$ group, having a molecular weight above 20,000 and being finely divided into particles having an average particle size less than 5 microns dispersed in a liquid vehicle containing from 20 parts to 150 parts per 100 parts of vinyl chloride polymer of a liquid polyepoxide having an epoxy equivalency between 1.0 and 3.0, and a minor amount of an epoxy-curing agent free of nitrogen.

16. A composition as defined in claim 15 wherein the polyepoxide is a liquid glycidyl polyether of 2,2-bis(4-hydroxyphenyl)propane having an epoxy equivalency between 1.0 and 2.5 and a molecular weight less than 400.

17. A composition as defined in claim 15 wherein the polyepoxide is a polymer of allyl glycidyl ether having an epoxy equivalency greater than 1.0 and a molecular weight between 200 and 500.

18. A spreadable, fluid composition capable of being cured to form hard, flexible products comprising a vinyl chloride polymer containing at least 90% vinyl chloride units and being selected from the group consisting of polyvinyl chloride and copolymers of vinyl chloride and dissimilar monomer containing a $CH_2=C=$ group, having a molecular weight above 20,000 and being finely-divided into particles having an average particle size less than 5 microns dispersed in a liquid vehicle containing 20% to 70% by weight of the polymer of a non-polymerizable liquid plasticizer compatible with the said polymer and boiling above 125° C. at 1 mm. pressure, from 20 parts to 150 parts per 100 parts of vinyl chloride polymer of a liquid polyether polyepoxide having an epoxy equivalency between 1.0 and 3.0, and a minor amount of an epoxy-curing agent which is free of nitrogen.

19. An organosol composition comprising a finely-divided polyvinyl chloride having an average particle size less than 5 microns and a molecular weight above 20,000 dispersed in a liquid vehicle containing a volatile organic solvent and at least 20 parts per 100 parts of polyvinyl chloride of a polymerizable plasticizer consisting of a liquid polyether polyepoxide having an epoxy equivalency between 1.1 and 3.0 and a molecular weight below about 400 and an epoxy-curing agent free of nitrogen.

20. A hard, flexible product obtained by heating the composition defined in claim 19 to a curing temperature.

References Cited in the file of this patent

UNITED STATES PATENTS

| | | |
|---|---|---|
| 2,559,177 | Terry et al. | July 3, 1951 |
| 2,585,506 | Shokal et al. | Feb. 12, 1952 |
| 2,602,785 | Wiles et al. | July 8, 1952 |